United States Patent
Katsuhara et al.

(10) Patent No.: US 11,369,883 B2
(45) Date of Patent: Jun. 28, 2022

(54) CONTRIBUTION DEGREE CALCULATION APPARATUS

(71) Applicant: Toyota Jidosha Kabushiki Kaisha, Toyota (JP)

(72) Inventors: Yasuo Katsuhara, Susono (JP); Mirai Shimoyama, Susono (JP); Hirotaka Kaji, Hadano (JP); Hirokazu Kikuchi, Hadano (JP); Nobuki Hayashi, Nisshin (JP); Hiroki Ashizawa, Toyota (JP); Tetsuro Sakaguchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/196,090

(22) Filed: Mar. 9, 2021

(65) Prior Publication Data
US 2021/0283511 A1    Sep. 16, 2021

(30) Foreign Application Priority Data
Mar. 13, 2020 (JP) .............................. JP2020-044092

(51) Int. Cl.
A63F 13/798 (2014.01)
A63F 13/847 (2014.01)

(52) U.S. Cl.
CPC .......... *A63F 13/798* (2014.09); *A63F 13/847* (2014.09); *A63F 2300/1012* (2013.01)

(58) Field of Classification Search
None
See application file for complete search history.

(56) References Cited

U.S. PATENT DOCUMENTS

| | | | | |
|---|---|---|---|---|
| 5,772,508 | A | * | 6/1998 | Sugita ..................... A63F 13/06 463/36 |
| 7,572,187 | B2 | * | 8/2009 | Van Luchene .......... A63F 13/12 463/42 |

(Continued)

FOREIGN PATENT DOCUMENTS

| JP | 2015-003080 A | 1/2015 |
|---|---|---|
| JP | 2020-097337 A | 6/2020 |

OTHER PUBLICATIONS

Shimada, Takeshi, "Visualization and KPIs—Is it possible to manage numerical values in soccer?", GLOBIS Findings, p. 1-10, Apr. 11, 2012.; Internet <URL: https://globis.jp/article/1935. (cited in specification).

*Primary Examiner* — Tramar Harper
(74) *Attorney, Agent, or Firm* — Dinsmore & Shohl LLP

(57) ABSTRACT

A contribution degree calculation apparatus calculates a contribution degree of each of a plurality of players in a video game in which the plurality of players participate. The contribution degree calculation apparatus includes: a biological information obtainer configured to obtain biological information respectively corresponding to the plurality of players; a game data obtainer configured to obtain game data generated by the plurality of players playing the video game; a first calculator configured to calculate a first index related to a degree of an influence by one of the plurality of players to another player and a second index related to a mental load of the one player, from biological information corresponding to the one player; and a second calculator configured to calculate a contribution degree of the one player from the first index and the second index and from the game data.

1 Claim, 1 Drawing Sheet

(56) References Cited

U.S. PATENT DOCUMENTS

| | | | | |
|---|---|---|---|---|
| 7,717,782 | B2* | 5/2010 | Van Luchene | A63F 13/847 |
| | | | | 463/9 |
| 11,090,566 | B1* | 8/2021 | Chow | A63F 13/355 |
| 2004/0229685 | A1* | 11/2004 | Smith | A63F 13/65 |
| | | | | 463/29 |
| 2006/0205503 | A1* | 9/2006 | Miura | A63F 13/212 |
| | | | | 463/36 |
| 2007/0173733 | A1* | 7/2007 | Le | G16H 10/20 |
| | | | | 600/544 |
| 2010/0227669 | A1* | 9/2010 | Van Luchene | G07F 17/32 |
| | | | | 463/23 |
| 2010/0227672 | A1* | 9/2010 | Amour | G06Q 30/02 |
| | | | | 463/25 |
| 2010/0240458 | A1* | 9/2010 | Gaiba | G06F 3/015 |
| | | | | 463/36 |
| 2012/0283014 | A1* | 11/2012 | Van Luchene | A63F 13/847 |
| | | | | 463/31 |
| 2013/0225267 | A1* | 8/2013 | Koch | A63F 13/798 |
| | | | | 463/25 |
| 2013/0339228 | A1* | 12/2013 | Shuster | G06Q 30/00 |
| | | | | 705/40 |
| 2014/0357352 | A1* | 12/2014 | Van Luchene | A63F 13/55 |
| | | | | 463/29 |
| 2020/0189576 | A1 | 6/2020 | Ikezawa et al. | |
| 2020/0401222 | A1* | 12/2020 | Wisbey | A61B 5/7275 |
| 2021/0379485 | A1* | 12/2021 | Katsuhara | A63F 13/67 |

* cited by examiner

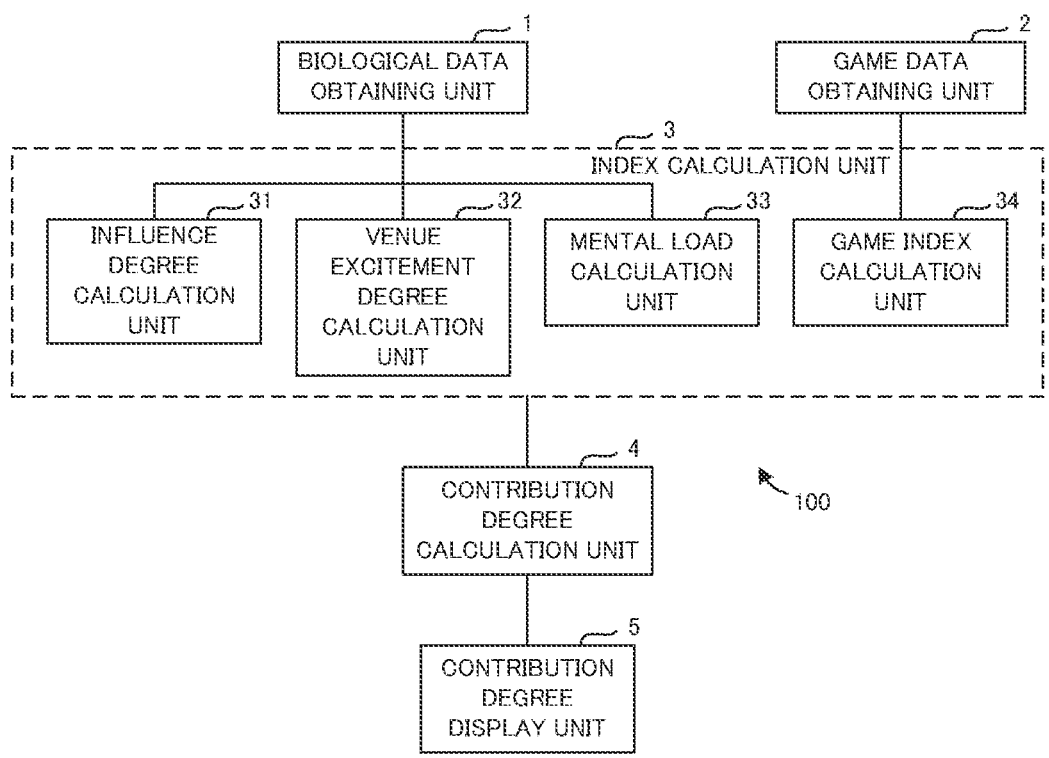

CONTRIBUTION DEGREE CALCULATION APPARATUS

CROSS-REFERENCE TO RELATED APPLICATIONS

This application is based upon and claims the benefit of priority of the prior Japanese Patent Application No. 2020-044092, filed on Mar. 13, 2020, the entire contents of which are incorporated herein by reference.

BACKGROUND

1. Technical Field

Embodiments of the present disclosure relate to a contribution degree calculation apparatus that is configured to calculate a contribution degree of a player that participates in a video game.

2. Description of the Related Art

In real-world sports, for example, KPI (Key Performance Indicator) or the like is often used to evaluate a player (refer to Takeshi Shimada, "Visualization and KPI-soccer can be used for numerical control", [online], Apr. 11, 2012, Globis, [Search on Feb. 5, 2020], Internet <URL: https://globis.jp/article/1935> (Non-Patent Literature 1)). Incidentally, for example, there has been proposed a technology/technique for reflecting an evaluation value of an existing baseball player in parameters of a game character corresponding to the baseball player (refer to Japanese Patent Application Laid Open No. 2020-097337 (Patent Literature 1)).

"Electronic Sports (e-sports)," which captures a competition using video games as a sporting event, is gaining momentum around the world. Even in e-sports, there is a need to evaluate a player. In the above related art, it is possible to evaluate an existing player; however, it is hard to apply the above related art to the evaluation of a player who operates a game character.

SUMMARY

In view of the problem described above, it is therefore an object of embodiments of the present disclosure to provide a contribution degree calculation apparatus that is configured to evaluate a player of a video game.

The above object of embodiments of the present disclosure can be achieved by a contribution degree calculation apparatus configured to calculate a contribution degree of each of a plurality of players in a video game in which the plurality of players participate, the contribution degree calculation apparatus including: a biological information obtainer configured to obtain biological information respectively corresponding to the plurality of players; a game data obtainer configured to obtain game data generated by the plurality of players playing the video game; a first calculator configured to calculate a first index related to a degree of an influence by one of the plurality of players to another player and a second index related to a mental load of the one player, from biological information corresponding to the one player out of the biological information; and a second calculator configured to calculate a contribution degree of the one player from the first index and the second index and from the game data.

BRIEF DESCRIPTION OF THE DRAWINGS

FIG. 1 is a block diagram illustrating a configuration of a contribution degree calculation apparatus according to an embodiment.

DETAILED DESCRIPTION

A contribution degree calculation apparatus according to an embodiment will be described. The contribution degree calculation apparatus according to the embodiment calculates a contribution degree of each of a plurality of players in a video game in which the plurality of players participate.

In a video game in which a plurality of players participate, a plurality of characters (so-called player characters) respectively corresponding to the plurality of players appear in the same game. At this time, it is possible to interpret the evaluation of each character (e.g., a score in the game, etc.) as the evaluation of a corresponding player. In a video game in which a plurality of players form a team and participate, however, each player may not be properly evaluated if the evaluation of each character is considered to be the evaluation of the player. This is because, for example, there is role sharing (e.g., an attacker, an assistant, a shield, etc.) for each character in the game, or there is communication between players who are playing the game (e.g., instructions, encouragement, etc.) in the real world.

Therefore, the contribution degree calculation apparatus calculates the contribution degree (i.e., evaluation) of a player by considering an index obtained from biological information about the player. In order to calculate the contribution degree of the player, the contribution degree calculation apparatus includes a biological information obtainer, a game data obtainer, a first calculator, and a second calculator.

The biological information obtainer obtains biological information respectively corresponding to a plurality of players. The biological information may include data that reflect the response of an autonomous nervous system, such as, for example, heartbeat, pulse, respiration, blink, line of sight, electroencephalogram (EEG), voice, and body motion. The heartbeat or the like of a player may be obtained, for example, by a wearable sensor worn by the player, or by performing image processing on an image of the player.

The game data obtainer obtains game data, such as, for example, a score in a game, a position of a player character, and an event that occurs during the progress of the game, from API (Application Program Interface) or the like. The game data obtainer may obtain the game data, for example, by performing image processing on an image corresponding to a game screen.

The first calculator calculates a first index related to a degree of an influence (e.g., instructions, encouragement, etc.) by one player to another player, and a second index related to a mental load of the one player, from biological information corresponding to the one player. The first calculator may calculate the first index, for example, on the basis of a result obtained by performing speech language processing on voice from the one player or by performing similar influences. The first calculator may calculate a degree of activity of a sympathetic or parasympathetic nerve, for example, from a time change in heartbeat of the one player, and may calculate the second index on the basis of the calculated degree.

The second calculator calculates the contribution degree of the one player from the first index and the second index calculated by the first calculator, and from the game data obtained by the game data obtainer.

As described above, the contribution degree calculation apparatus calculates the contribution degree of a player, by considering the index (the first index and the second index described above) obtained from the biological information about the player in the real world, in addition to the game data. Therefore, according to the contribution degree calculation apparatus, it is possible to appropriately evaluate the player of the video game.

A contribution degree calculation apparatus 100 as a specific example of the contribution degree calculation apparatus according to the embodiment will be described with reference to FIG. 1. In FIG. 1, the contribution degree calculation apparatus 100 is provided with a biological data obtaining unit 1, a game data obtaining unit 2, an index calculation unit 3, a contribution degree calculation unit 4, and a contribution degree display unit 5.

The biological data obtaining unit 1 obtains the biological information including data that reflect the response of an autonomous nervous system, such as, for example, heartbeat, pulse, respiration, blink, line of sight, electroencephalogram (EEG), voice, and body motion, for example, from the output of a wearable sensor worn by each player. In addition to the player, the biological data obtaining unit 1 obtains the biological information (e.g., heartbeat, etc.) about those who are other than the player, such as, for example, a supervisor, a coach, and an audience, from the output of a wearable sensor worn by those who are other than the player.

The game data obtaining unit 2 obtains game data, such as, for example, a score in a game, a position of a player character, and an event that occurs during the progress of the game.

The index calculation unit 3 includes an influence degree calculation unit 31, a venue excitement degree calculation unit 32, a mental load calculation unit 33, and a game indicator calculation unit 34.

The influence degree calculation unit 31 calculates an influence degree, which is an index indicating a degree of an influence by one player to another player (e.g., a teammate), for example, by using audio data on each player or the like from among the biological information. For example, focusing on the continuity of the audio data, the influence degree calculation unit 31 may determine that two players have a conversation when one player utters a sound within a predetermined time (e.g., 1 second) after another player does so. In this case, the influence degree calculation unit 31 may set the number of conversations of one player as the influence degree of the one player. The influence degree calculation unit 31 may set the number of statements corresponding to encouragement (e.g., You can do it, Don't give up, Hang in there, Let's turn things around, Let's hold out, etc.) out of the statements of one player as the influence degree of the one player. Focus on the pitch of voice of one player, the influence degree calculation unit 31 may set a statement with a pitch of voice that is higher than a reference value related to the one player, as a positive statement, and may set a statement with a pitch voice that is lower than the reference value, as a negative statement. The influence degree calculation unit 31 may set the ratio of the positive statements to all the statements of one player as the influence degree of the one player.

The venue excitement degree calculation unit 32 calculates an excitement degree, which is an index indicating a degree of excitement in a venue, for example, by using the biological information about an audience (e.g., heartbeat, etc.), from among the biological information. For example, focusing on a change in heartbeat of the audience, the venue excitement degree calculation unit 32 may calculate the excitement degree from the number of times that the heartbeat suddenly increases. For example, focusing on the audience's voice, the venue excitement degree calculation unit 32 may calculate the excitement degree from the number of times that the sound pressure of the venue is greater than or equal to a predetermined value. For example, focusing on the body motion of the audience, the venue excitement degree calculation unit 32 may calculate the excitement degree from the number of times that the audience has a relatively large body motion. Incidentally, the body motion of the audience may be estimated on the basis of the magnitude of acceleration detected, for example, by a wearable sensor worn by the audience. The venue excitement degree calculation unit 32 may, for example, perform image processing on an image captured in the venue to detect an audience with a smile and may calculate the excitement degree from the ratio of the audience with a smile.

The mental load calculation unit 33 may calculate, for example, an activity degree of the sympathetic or parasympathetic nerve of each player, as a mental load, from the biological information about each player. Incidentally, for example, the activity of the sympathetic nerve may be obtained from fluctuation information (e.g., variance, etc.) about RRI (R-R Interval) related to the heartbeat. When fluctuation indicated by the fluctuation information is relatively small, the mental load calculation unit 33 may determine that the activity degree of the sympathetic nerve is superior (that is, the mental load is large). The mental load calculation unit 33 may calculate the ratio of a period in which the activity degree of the sympathetic nerve is superior in a game play period, or the intensity of the activity of the sympathetic nerve, as the mental load.

The game indicator calculation unit 34 calculates a game index, which is an index related to game development (e.g., being in the lead, losing, etc.) and victory or defeat, by using the game data. The game index calculation unit 34 may determine superiority or inferiority as the game development, for example, on the basis of a difference between the game scores of two teams, or the number of times that a character of an ally team defeats a character of an opponent team. The game index calculation unit 34 may determine the superiority or inferiority as the game development from a numerical value related to game contents (e.g., a degree of entry into the opponent's territory by each character in the game, the number of obtained items, etc.).

The contribution degree calculation unit 4 calculates the contribution degree of each player on the basis of the influence degree, the excitement degree, the mental load, and the game index. The contribution degree calculation unit 4 may calculate the contribution degree, for example, by using a numerical formula of "Influence degree×Coefficient 1+Excitement degree×Coefficient 2+Mental load×Coefficient 3+Game index×Coefficient 4". Incidentally, the coefficients 1 to 4 may be all "1" or may vary depending on the role of the character in the game or the role of the player in the real world. Alternatively, the coefficients 1 to 4 may be set by techniques such as machine learning.

The contribution degree display unit 5 displays the calculated contribution degree. A display aspect of the contribution degree may be, for example, a pie chart, a percentage or the like.

(Technical Effects)

According to the contribution degree calculation apparatus 100, a unified index that is the contribution degree allows the degree of activity of each player in a team to be quantitatively evaluated, especially regarding a video game in which a plurality of players form a team and participate. For example, a team supervisor and a coach may quantitatively evaluate and consider teamwork and balance of a team by referring to the contribution degree. For example, the display of the contribution degree allows the audience's eyes to be directed not only to players who are playing conspicuously, but also to other players. For example, when the game progress of the video game is distributed via a network or the like, a commentator or the like may be able to enrich a running commentary with reference to the contribution degree.

Modified Example

The contribution degree calculation unit 4 may calculate the contribution degree on the basis of at least one of the influence degree, the excitement degree, and the mental load described above, and on the basis of the game index. For example, when the excitement degree is not used to calculate the contribution degree, the index calculation unit 3 may not include the venue excitement degree calculation unit 32, and the biological data obtaining unit 1 may not obtain the biological information about those who are other than the player.

Aspects of embodiments of the present disclosure derived from the embodiment and modified example described above will be described below.

A contribution degree calculation apparatus according to an aspect of embodiments of the present disclosure is a contribution degree calculation apparatus configured to calculate a contribution degree of each of a plurality of players in a video game in which the plurality of players participate, the contribution degree calculation apparatus provided with: a biological information obtainer configured to obtain biological information respectively corresponding to the plurality of players; a game data obtainer configured to obtain game data generated by the plurality of players playing the video game; a first calculator configured to calculate a first index related to a degree of an influence by one of the plurality of players to another player and a second index related to a mental load of the one player, from biological information corresponding to the one player out of the biological information; and a second calculator configured to calculate a contribution degree of the one player from the first index and the second index and from the game data.

In the above-described embodiment, the biological data obtaining unit 1 corresponds to an example of the biological information obtainer, the game data obtaining unit 2 corresponds to an example of the game data obtainer, the index calculation unit 3 corresponds to an example of the first calculator, and the contribution degree calculation unit 4 corresponds to an example of the second calculator. The "influence degree" and the "mental load" in the above-described embodiment respectively correspond to an example of the "first index" and the "second index".

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A contribution degree calculation apparatus configured to calculate a contribution degree of each of a plurality of players in a video game in which the plurality of players participate, the contribution degree calculation apparatus comprising:
   a processor programmed to:
      obtain biological information, which includes at least one of voice and heartbeat, respectively corresponding to the plurality of players from each of wearable sensors worn by the plurality of players respectively;
      obtain game data generated by the plurality of players playing the video game from an Application Program Interface;
      calculate a first index of one player of the plurality of players by obtaining a result of speech language processing on voice included in biological information corresponding to the one player out of the obtained biological information, and a second index by calculating a degree of activity of a sympathetic or parasympathetic nerve on the basis of a time change in heartbeat included in the biological information corresponding to the one player, wherein the first index relating to a degree of an influence by the one player to another player of the plurality of players, wherein the second index relating to a mental load of the one player; and
      calculate a contribution degree of the one player from the first index and the second index and from the game data.

* * * * *